Jan. 13, 1970   M. L. GREENBERG ET AL   3,489,062
FACING HEAD

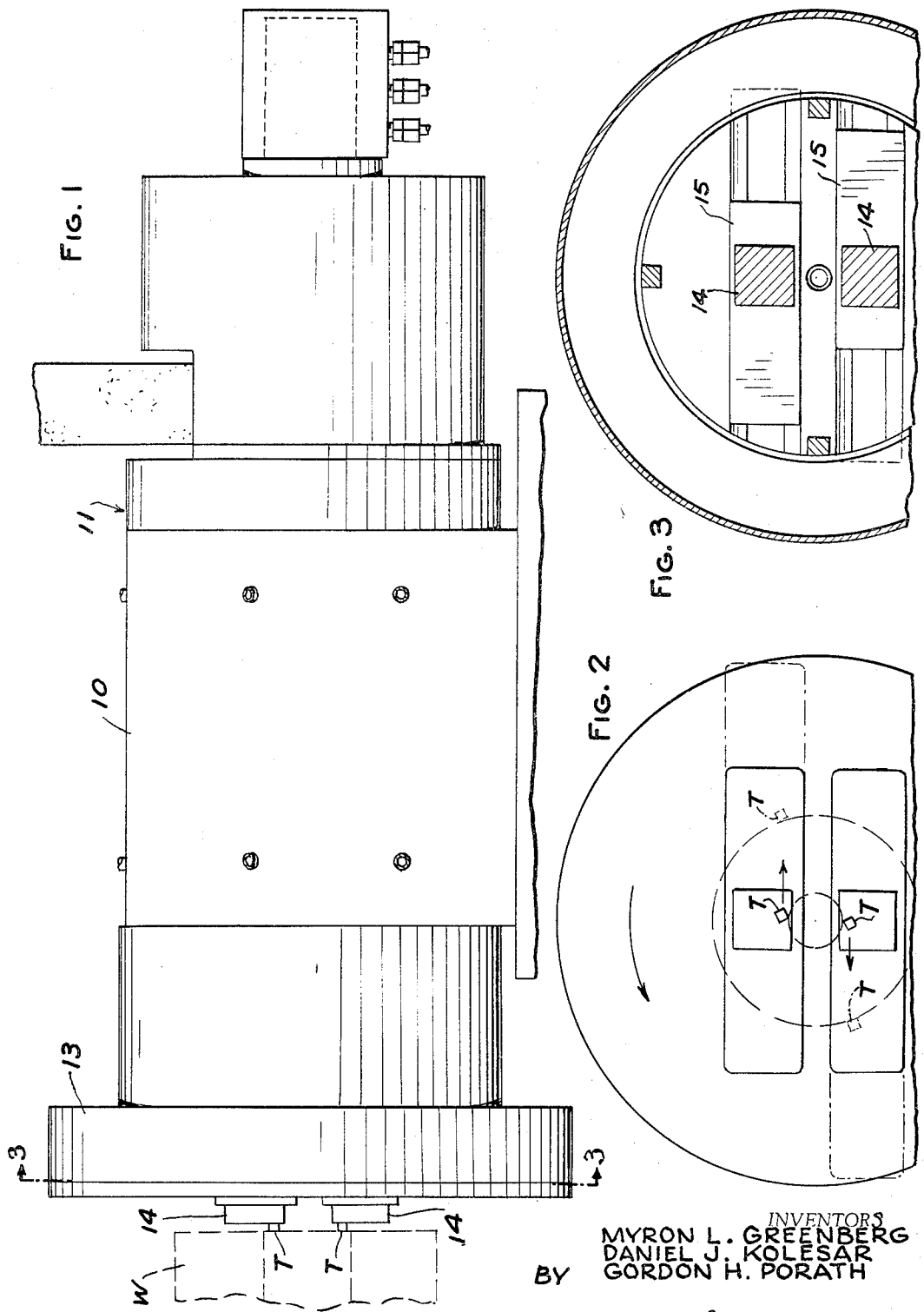

Filed Feb. 28, 1968   5 Sheets-Sheet 5

INVENTORS
MYRON L. GREENBERG
DANIEL J. KOLESAR
GORDON H. PORATH
BY
Barnes, Kisselle, Raisch & Choate
ATTORNEYS United States Patent Office 3,489,062
Patented Jan. 13, 1970

3,489,062
FACING HEAD
Myron L. Greenberg, Union Lake, Daniel J. Kolesar, Warren, and Gordon H. Porath, Detroit, Mich., assignors to The Babcock & Wilcox Company, New York, N.Y., a corporation of New Jersey
Filed Feb. 28, 1968, Ser. No. 708,856
Int. Cl. B23c 7/00
U.S. Cl. 90—11                    10 Claims

ABSTRACT OF THE DISCLOSURE

The facing head disclosed herein comprises a spindle which is rotatably mounted on a base by hydrostatic bearings. A pair of tool supports are mounted on slides which are movable radially with respect to the spindle on one end of the spindle. The slides are supported on the spindle by hydrostatic bearings and fluid motors are provided on the spindle for adjusting the position of the slides radially of the spindle. A rotatable fluid coupling is provided at the opposite end of the spindle for supplying fluid to the hydrostatic bearings and the fluid motors. Fluid lines extend from the fluid coupling to the hydrostatic bearings and the fluid motor.

---

This invention relates to machining apparatus and particularly to a facing head.

BACKGROUND OF THE INVENTION

The problem of accurate machining of large diameter faces which are perpendicular to the axis of the machining heads has been solved in the past in three main ways, as follows:

(1) A milling spindle on a slide and cross slide advances, mills off the face with side motion of the cross slide end retracts. This method has the advantage of simplicity, but does not produce a very good surface due to the continuously interrupted cut. Also it is useless if the face is behind a center hub or outer flange. Related to this is simple plunge cutting, without side motion.

(2) A single or duel tool holder, feeding outward at such a rate that the tool points trace "concentric" spiral paths, is carried by an outer spindle. A radial feed actuator may be operated by the outer spindle rotation with cam or clutch disengagement or a rotating feed actuator or a pair thereof with limited travel may be provided. A means of synchronizing the two tool feeds and of automatically balancing the centrifugal forces must also be provided.

(3) A slow-speed outer spindle with one or a pair of eccentrically mounted high-speed inner spindles with fly cutting or face milling tooling in a so-called "orbiting" arrangement may be used. A feed slide with axial travel to a positive stop controllable by hydraulic or mechanical means to plunge slowly to depth and to retract at the end of the cycle is also required. The inner spindle must be counterbalanced and the cutting head must also be balanced if only one is used; if two inner spindles are used, they must be synchronized. This is identical in cutting geometry to the method in which the milling spindle is placed eccentrically and the entire work rotates.

Each of these basic types is adaptable to different kinds of workpieces, to different finish requirements and different workpiece holding and transfer arrangements.

Each of the aforementioned methods or systems is subject to the disadvantages that it is difficult to produce precision work, it is relatively complex to produce the desired movements and it is subject to wear.

Among the objects of the present invention are to provide facing heads which are not subject to stick-slip feeding, which is a considerable nuisance and a source of both scrap parts and of failure of the head in conventional apparatus, to provide a facing head in which the tool holder bearings actively suppress vibration, to provide automatic balancing during feedout, to eliminate as much complexity as possible in the feedout mechanism compared to present drawbar and bell crank units, to provide a more inherently accurate outer, high speed support bearing so as to improve facing tolerances, tool wear and production rate, and to provide an internal synchronized positive stop which will limit overtravel under the influence of centrifugal force.

SUMMARY

The facing head disclosed herein comprises a spindle which is rotatably mounted on a base by hydrostatic bearings. A pair of tool supports are mounted on slides which are movable radially with respect to the spindle on one end of the spindle. The slides are supported on the spindle by hydrostatic bearings and fluid motors are provided on the spindle for adjusting the position of the slides radially of the spindle. A rotatable fluid coupling is provided at the opposite end of the spindle for supplying fluid to the hydrostatic bearings and the fluid motors. Fluid lines extend from the fluid coupling to the hydrostatic bearings and the fluid motor.

DESCRIPTION OF THE DRAWINGS

FIG. 1 is a fragmentary side elevational view of an apparatus embodying the invention.

FIG. 2 is a fragmentary end view of the apparatus shown in FIG. 1.

FIG. 3 is a fragmentary sectional view taken along the line 3—3 in FIG. 1.

DESCRIPTION

Figure 4:
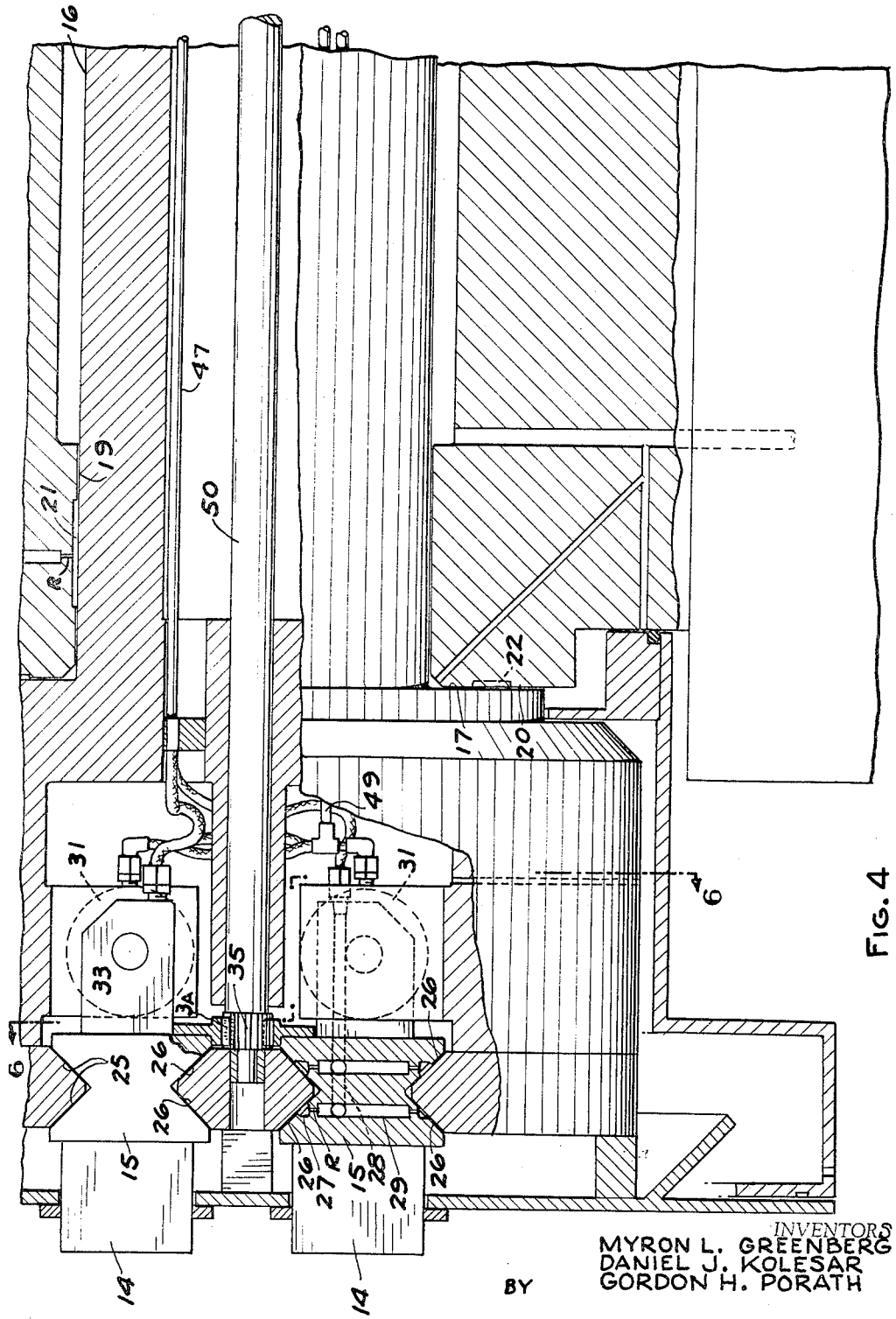
FIG. 4 is a fragmentary longitudinal sectional view of one portion of the apparatus.

Referring to FIG. 1, the facing head embodying the invention comprises a base 10 which includes a removable thrust member 11 that rotatably supports a spindle 13. Specifically the spindle 13 is mounted within the base 10 by hydrostatic bearings, as presently described. The spindle 13 supports a pair of tool supports 14 on which tools T are mounted. The tool supports 14 are in turn fixed on slides 15 that are supported by hydrostatic bearings and are movable radially of the spindle to change the area being machined during operation.

Referring to FIGS. 4, 5, 7 and 8, the spindle includes an axial cylindrical surface 16 and spaced radial surfaces 17, 18. The base 10 includes complementary surfaces which define a cylindrical surface 19 and radial surfaces 20. Circumferentially spaced pressure recesses or pads 21, 22, 23 are provided on the surfaces 19, 20 and a restrictor R is associated with each pressure pad. Fluid under pressure, preferably hydraulic fluid, is supplied to each restrictor R through fluid passages 23. When fluid is supplied to the restrictors R and in turn to the fluid passages, it flows in a thin film between the surfaces 16, 19 and 18, 20. Such a hydrostatic bearing is more completely shown and described in the patent to Gordon H. Porath No. 3,223,463 issued Dec. 14, 1965.

Figure 6:
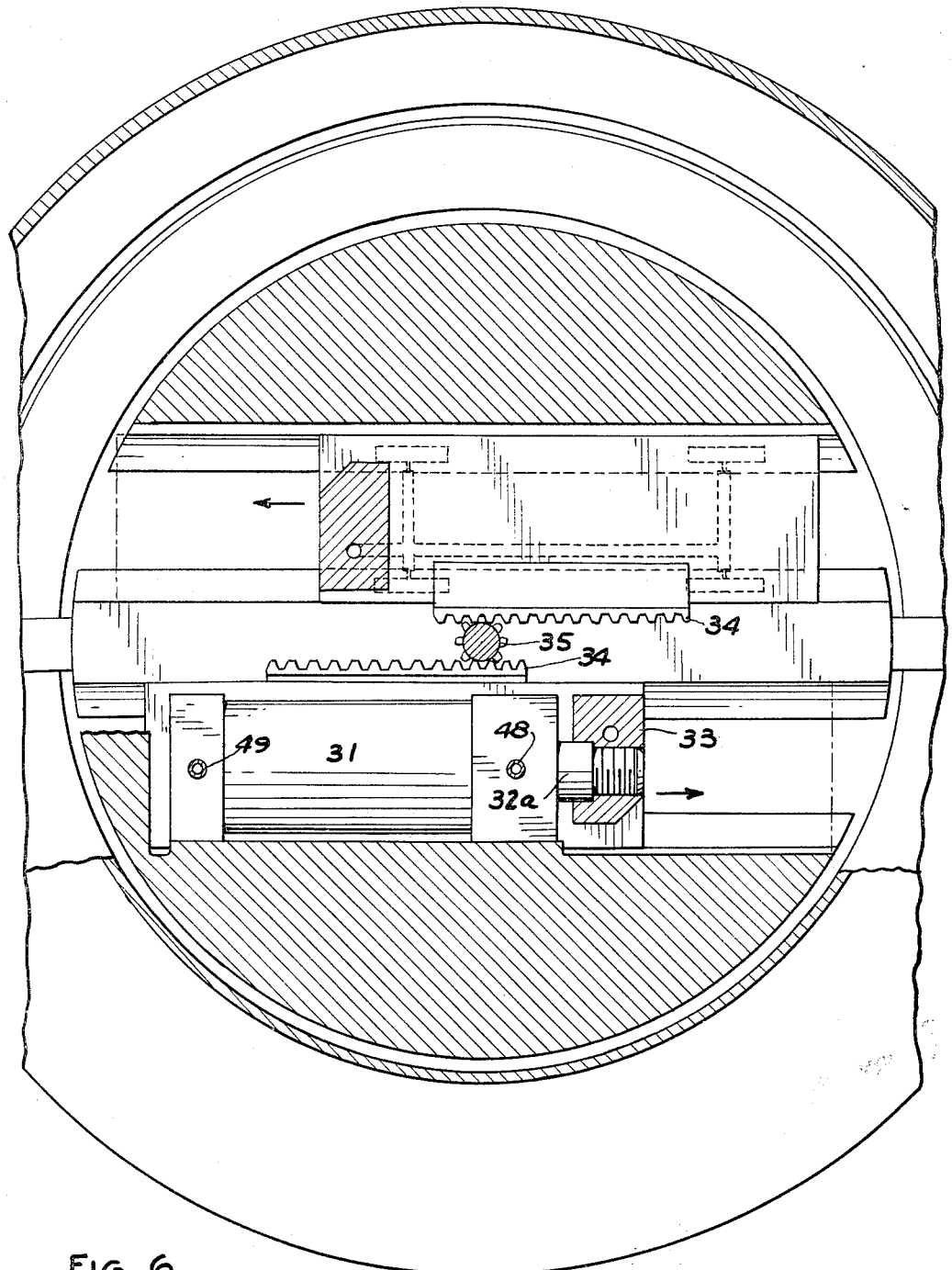
FIG. 6 is a fragmentary sectional view taken along the line 6—6 in FIG. 4.
Figure 7:
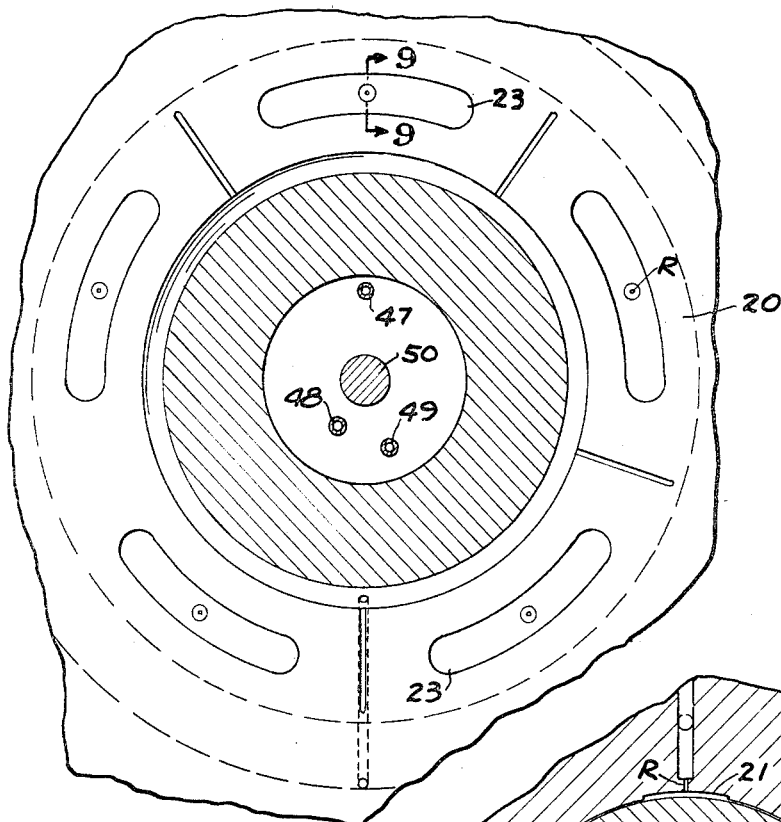
FIG. 7 is a fragmentary sectional view taken along the line 7—7 in FIG. 5.
Figure 8:
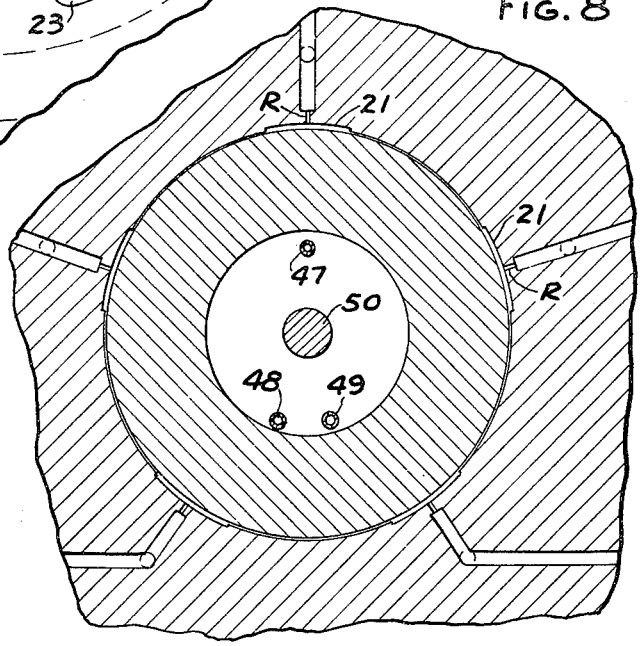
FIG. 8 is a fragmentary sectional view taken along the line 8—8 in FIG. 5.

Referring to FIGS. 3, 4 and 6, each slide 15 has V-shaped side surfaces 25. The end of the spindle has complementary surfaces 26 defining a slideway for each of the slides 15. Each slide 15 is formed with longitudinally spaced pressure recesses or pads 27 in the surfaces 25 and a restrictor R is provided in association with each pressure pad. Fluid is supplied to each of the pressure pads as presently described through inlet passages 28 and intercommunicating passages 29.

Figure 9:
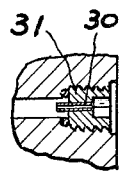
FIG. 9 is a fragmentary sectional view taken along the line 9—9 in FIG. 7.

Each restrictor R is preferably in the form of a capillary 30 fixed to a nut 31 and threaded into the base of the associated pressure pad as shown in FIG. 9.

A hydraulic cylinder 31 is mounted in the spindle and has its piston 32a threaded into an extension 33 on each side 15 so that the position of each slide 15 and in turn the work support 14 thereon may be adjusted radially of the spindle. In addition each slide 15 has a rack 34 thereon and a pinion 35 is meshed with the racks 34 (FIG. 6) so that the slides 15 are forced to move in timed relation and in unison relative to one another.

Figure 5:
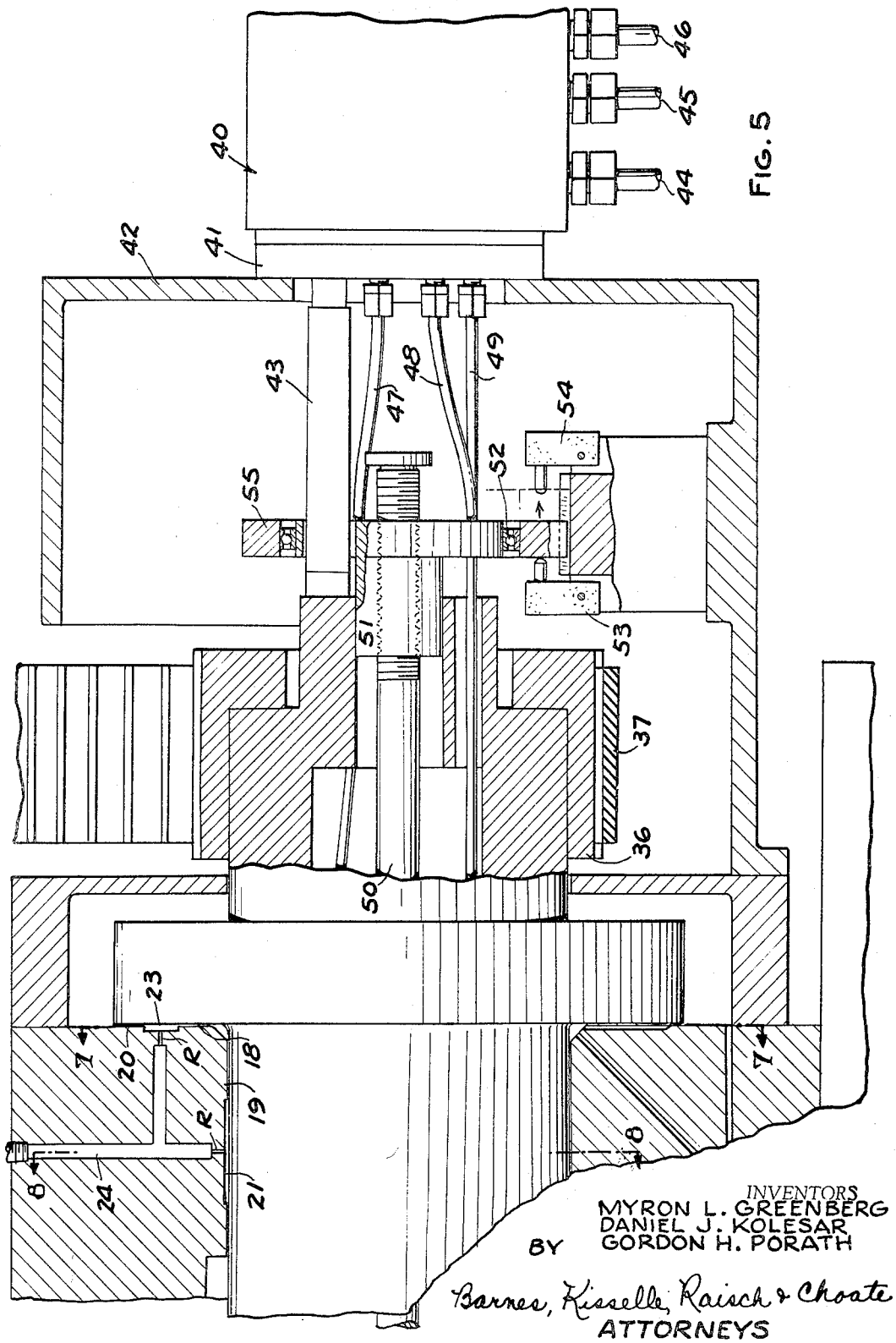
FIG. 5 is a fragmentary longitudinal sectional view of another portion of the apparatus.

As shown in FIG. 5, the spindle is formed with a timing gear 36 over which a timing belt 37 is meshed to rotate the spindle at the desired machining speed. As further shown in FIG. 5, a rotatable fluid coupling 40 has its housing 41 fixed on an extension 42 that in turn is fixed on the base. The rotatable member of the fluid coupling 40 is connected to the spindle by an arm 43. The fluid coupling may be of conventional construction and comprises inlets 44, 45, 46 for supplying fluid respectively to the hydrostatic bearings for the spindle and the hydrostatic bearings for the slides and the cylinders 31. Lines 47, 48 extend to opposite ends of the cylinders 31 while a line 49 extends to the passages 28 of the slides. As can be seen, flexible couplings or lines are provided in order to permit radial movement of the slides 15 with respect to the spindle.

In operation, the fluid is supplied to the pressure pads 20, 21, 23 so that the spindle is rotatably supported in the base. The spindle is rotated by operation of the timing belt 37. As the machining operation continues and it is desired to change the radial position of the tools, fluid is supplied to the cylinder 32 to translate the slides 15 radially. The slides are supported in stable relation to the slideways by the flow of fluid continuously to the pressure pads 27.

In order to be able to control the position of the tools, the pinion 35 is mounted on the end of a shaft 50 which has its other end threaded through a nut 51 that is mounted in a bearing 52. The nut 51 has a portion thereof through which the projection 43 extends so that the nut does not rotate with respect to the spindle rotor. As the position of the slides 15 in the slideways is changed, the shaft 50 is rotated causing the nut 51 to be translated axially. Limit switches 53, 54 on the base are engaged by the race 55 surrounding the bearing 52 to indicate that the slides have been moved to the extremes of the radial movement. The switches 53, 54 can be used to control the cycle. The race 55 is keyed so that it does not rotate.

We claim:
1. In a facing head, the combination comprising
a base,
a spindle,
hydrostatic bearing means for rotatably supporting said spindle in said base,
means for rotating said spindle,
a pair of tool supports,
a slide individual to each said tool support for adjusting said tool support radially of said spindle,
hydrostatic bearing means supporting each said slide for movement radially of said spindle in side-by-side relation,
means on said spindle for moving and holding said slides in radial adjusted position,
a rotatable fluid coupling between said base and said spindle,
and fluid lines extending axially from said coupling to said hydrostatic bearing means for said spindle and to said hydrostatic bearing means for said slide.
2. The combination set forth in claim 1 wherein said means for moving said slides comprises a linear fluid motor connected to each of said slides,
and fluid lines extending from said rotary fluid coupling to said motors.
3. The combination set forth in claim 1 where each said slide comprises V-shaped side surfaces,
said spindle having complementary surfaces forming a slideway,
said hydrostatic bearing means comprising a plurality of pressure pads on said slide and a restrictor associated with each said pressure pad.
4. The combination set forth in claim 1 including means extending axially of said spindle and operatively connected to said slides for indicating the relative position of said slides.
5. The combination set forth in claim 4 wherein said last-mentioned means comprises a pinion meshed with said slides,
a shaft extending axially of said spindle and connected to said pinion,
a travelling nut on the other end of said shaft remote from said slides,
means for preventing rotation of said nut with respect to said spindle.
and switch means operatively engaged by said nut as it is moved axially of said shaft.
6. In a facing head, the combination comprising:
a base,
a spindle,
said base and said spindle having complementary surfaces,
hydrostatic bearing means on said complementary surfaces for rotatably supporting said spindle in said base,
means for rotating said spindle,
a pair of tool supports,
a slide individual to each said tool support for adjusting said tool support radially of said spindle,
longitudinally spaced hydrostatic bearing means supporting each said slide for movement radially of said spindle in side-by-side relation,
means on said spindle for moving and holding said slides in radial adjusted position,
a rotatable fluid coupling between said base and said spindle,
said fluid lines extending axially from said coupling to said hydrostatic bearing means for said spindle and to said hydrostatic bearing means for said slide.
7. The combination set forth in claim 6 wherein said means for moving said slides comprises a linear fluid motor connected to each of said slides,
and fluid lines extending from said rotary fluid coupling to said motors.
8. The combination set forth in claim 6 where each said slide comprises V-shaped side surfaces,
said spindle having complementary surfaces forming a slideway,
said hydrostatic bearing means comprising a plurality of pressure pads in said slide and a restrictor associated with each said pressure pad.

9. The combination set forth in claim 8 including means extending axially of said spindle and operatively connected to said slides for indicating the relative position of said slides.

10. The combination set forth in claim 9 wherein said last-mentioned means comprises a pinion meshed with said slides,
   a shaft extending axially of said spindle and connected to said pinion,
   a travelling nut on the other end of said shaft remote from said slides,
   means for preventing rotation of said nut with respect to said spindle,
and switch means operatively engaged by said nut as it is moved axially of said shaft.

References Cited
UNITED STATES PATENTS

| | | | |
|---|---|---|---|
| 3,103,135 | 9/1963 | Widmer et al. | 77—3 |
| 3,418,025 | 12/1968 | Hucks et al. | 308—5 |
| 3,438,289 | 4/1969 | Kampmier | 77—56 |

GERALD A. DOST, Primary Examiner

U.S. Cl. X.R.

82—2; 308—9